United States Patent Office 3,494,835
Patented Feb. 10, 1970

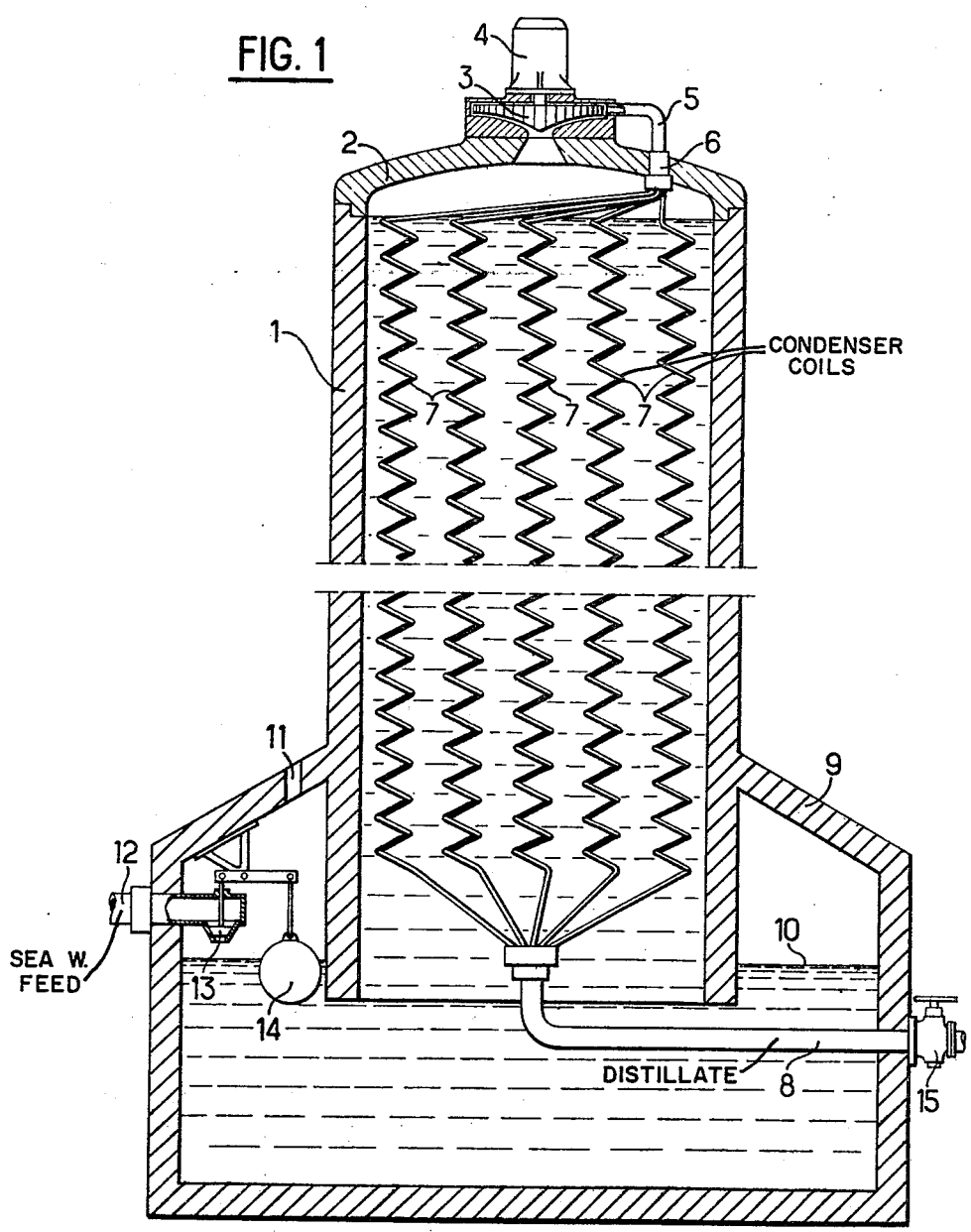

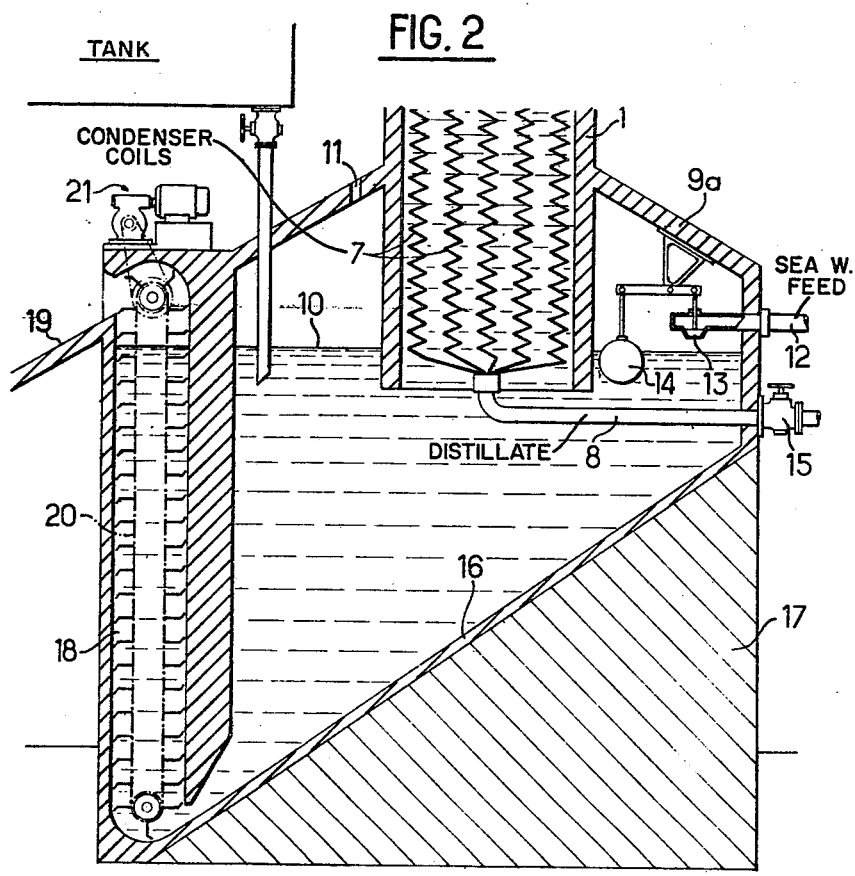
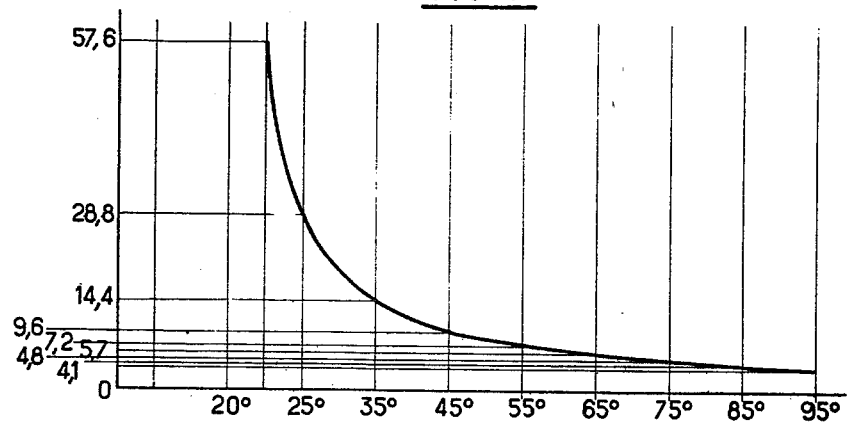

3,494,835
SYSTEM FOR THE DESALINATION OF SEA WATER
Pierre Mahistre, 29 Rue Pasteur, Pantin, Seine-St.-Denis, France
Filed Jan. 15, 1968, Ser. No. 697,760
Claims priority, application France, Nov. 29, 1967, 130,254
Int. Cl. C02b 1/06; B01d 3/42, 3/10
U.S. Cl. 202—181                                    1 Claim

ABSTRACT OF THE DISCLOSURE

A system of recovering fresh water from sea water comprising introducing sea water into a tube, evacuating the upper end of the tube so as to vaporize water thereat, collecting the water, and condensing the water by bringing it into thermal contact with that part of the sea water near the boiling surface within the tube so that the vapors give up their heat of vaporization to said sea water portion, and subsequently withdrawing the condensed water out of said tube and delivering it to a utilizaton reservoir.

---

The present invention relates to a method and an apparatus for the distillation under vacuum of sea water and more particularly to the use of a so-called "open" refrigerating circuit operating with a small difference in absolute temperature between a hot source and a cold source with the advantage of increasing the yield of such a distillation over conventional systems. According to the invention, improved results are obtained by returning heat to the liquid cooled as a result of its vaporization at the very place where said heat was lost.

The open refrigerating circuit arrangement incorporating the invention comprises a constant level tank communicating with the atmosphere and a barometric tube closed at its upper end and having its lower end submberged in the water to be treated in the constant level tank. A compressor at the top of the tube lowers the pressure to draw sea water into the tank and feed vapor therefrom to a heat exchanger extending downward through the tube and feeding a valved fresh water run off line.

The pressure maintained in the upper portion of the tube corresponds to the respective vaporization point at the temperature T and T', respectively, of the salt water present in the tank and tube and of the fresh water present in said heat exchangers. The evaporation temperatures of said two types of water are maintained very close to each other.

These levels are a function of the value of the atmospheric pressure, of the respective densities of the salt water and the fresh water, and of the temperature T of the salt water constituting the hot source of the arrangement.

The operation of the said open refrigerating circuit is as follows: The pressure in the tank would normally drop to a value below the vaporization point of the salt water if it were not for the continuous evaporation of the latter due to the action of the compressor.

The vapor drawn off by the compressor and delivered into the exchanger (i.e., condenser coils) is collected at the base of the latter in the form of fresh water.

The thermal energy corresponding to the heat of vaporization which is taken entirely from the upper layers of the column of salt water in the tube is returned to a substantial extent to the same mass of water substantially at the same level of the tube due to the condensation of the fresh water.

The emergence of the fresh water at atmospheric pressure is assured solely by gravity.

Under these conditions, the degree of evacuation which the compressor must assure is generally equal to the ratio of the vaporization pressure of the fresh water at the temperature T' prevailing in the condenser and the salt water which fills the barometric tube at the temperature T which is slightly higher than T' due to the imperfection inherent in any physical arrangement.

An arrangement for carrying out the method referred to above constitutes a new combination of known means, namely, a barometric Torricelli tube and a Kelvin refrigerating machine. This arrangement utilizes a conventional electric or thermal motor, a centrifugal or volumetric compressor all of conventional type and a heat exchanger which does not have any special technical characteristics.

Of course, the materials used to manufacture these apparatus and to protect them against corrosion correspond to solutions already known in the case of other similar problems involving comparable temperatures and in which the metal is called upon to withstand the action of salt water or, more precisely, the action of saline mists which may be present in the tank.

The arrangement in accordance with the invention can be used for the equipping of individual or apartment buildings, for agricultural operations, on board vessels, or finally, to produce industrial sea water desalification installations of high power. Only the dimensioning and the installed power vary in accordance with type of use contemplated and are proportioned to the amount of production desired.

The invention contemplates in particular a variant embodiment which comprises collecting as by-product inorganic salts in solution in sea water.

The characteristics of the present invention will be better understood from a reading of the following description of two embodiments of installations which permit the use of the process according to the present invention, these two embodiments being given by way of illustration and not of limitation and being described with reference to the accompanying drawing in which:

FIGURE 1 is a diagrammatic sectional showing of an installation embodying the present invention.

FIGURE 2 is a diagrammatic representation of a second embodiment of the invention including means for collecting the inorganic salts.

FIGURE 3 is a theoretical yield curve of the refrigerating installation, drawn for a temperature of 15° C. of the hot source as a function of the temperature T' of the cold source, which as has been pointed out, is necessarily higher than that of the so-called "hot" source.

The barometric tube or cylinder 1 shown in FIGURE 1 may be made of cast iron or reinforced concrete and has a height which, in the example described, is 10.50 m. A convex cover 2 closes the barometric tube 1 at its top and has sufficient resistance to support the crushing force exerted by the atmosphere. This cover 2 supports a centrifugal compressor 3 driven by an electric motor 4 at a constant speed corresponding to its optimum output.

The vapor collector 5 located at the outlet of the spiral of compressor 3 passes at 6 through the cover 2 and penetrates into the cylinder 1. This collector 5 is connected to a battery of coils 7 made of a metal which is a good conductor of heat, such as red copper, aluminum or other suitable alloy. Coils 7 are protected by conventional means against the corrosive action of the sea water contained in the tube 1. The coils which are of helical form are, in the example chosen, formed of thin-walled tubes of 10 mm. inside diameter, each turn of the helix formed having an inside diameter of 10 cm. and occupying a height of 10 cm., which corresponds to ten turns per running meter of coil. The total height of the helix is equal to nine meters and the inside volume of each coil is therefore slightly greater than 3 liters. The number of coils is a function of the installed power and therefore determines the diameter of the barometric tube 1. In order to obtain a good output, it is necessary, as a matter of fact, to provide thirty coils per square meter of cross-section of the said barometric tube 1. Below said value there is a danger of excessive surface cooling below 4° C. of the salt water which might cause a stoppage of operation of the vaporization. Above this value the gain in output obtained is negligible. This number of coils corresponds to a total volume of these coils of between 90 and 100 times the volume of distilled water which it is desired to obtain per second, namely, one liter per second in the example described.

At its base, the heat exchanger is connected to an evacuation pipe 8 made of the same metal as the coils and having a cross-section equal to the sum of the cross-sections of said coils.

The coil assembly is rigidly connected with the wall of the cylinder 1 by braces provided, for example, radially within said cylinder and which have not been shown in the drawing as a measure of simplification.

The base of the cylinder 1 penetrates into a tank 9 and extends below the sea water surface 10 contained therein. Atmospheric pressure is provided in tank 9 due to the provision of at least one orifice 11 causing the inside of the tank 9 to communicate with the atmosphere. Sea water inlet 12 is controlled by a valve 13 operated by a float 14 which maintains the level of sea water in the tank 9 constant.

The distilled water outlet 8 is also controlled for the same purpose by a valve 15 which is electrically controlled in synchronism with the placing in operation of the motor 4.

In the second embodiment shown in FIGURE 2, a constant-level tank 9a is used, but the bottom 16 of this tank, resting on a supporting foundation 17, has a large slope and debouches as a funnel onto a well 18 in which there is installed a bucket belt 20 driven by motor 21 for lifting inorganic salts from the bottom of said tank. The belt has perforated buckets so that after having exceeded the constant level of salt water in the tank 9a, the inorganic salts lifted by the said belt can drain before being projected onto an inclined plane 19.

It should be noted that the cross-section of well 18 may be rectangular so that at the level where it is desired to project a pulverulent material onto the inclined plane 19, this material is retained between the buckets by the conveyor belt itself, composed of adjacent rigid elements articulated to each other, and between two side flanges which prevent the said material from pouring into the well 18. In order to simplify the drawing, these inorganic salt retention devices, provided at the upper part of the belt 20, have not been shown.

Of course, belt 20 is indicated only by way of illustration and not of limitation, and it is possible to provide different arrangements, for instance, of the "worm" type which cooperate with shutoff devices arranged radially and moving vertically so as to assure the lifting of the material present on the threads of the worm upon the rotation of the latter. In general, in this case, various shutoff devices are provided distributed from place to place and mounted on an endless chain parallel to the axis of the worm.

In the embodiment of FIGURE 2, the precipitation cycle of the inorganic salts is first of all started by first feeding the variable-level tank at the start of the distillation by means of a sea water reservoir having a given capacity, the distillation of this given quantity of sea water causing its salinity to increase until the limit of saturation of sea water is amply exceeded. Thereupon, in order to take into account the increased salinity of the sea water coming from the said reservoir and the additional volume of sea water of normal salinity which is then introduced to return to the desired constant level in the tank, the total of the mass of sea water under treatment in said tank and in the barometric tube which extends therein is then maintained constantly saturated. The precipitation of inorganic salts will then be continuous, in the same way as the flow of distilled water. The form of the tank has the purpose of favoring the flow of the brine and of the precipitate towards the well.

With an installation of the type depicted in FIGURE 2, it is possible to recover 15 to 16 kg. of inorganic salts per ton of distilled water produced.

It should be noted that for the suitable carrying out of the method of the invention, that is to say, to assure the continuous evaporation of the sea water contained in the barometric tube, the surface evaporation must not be too rapid and must not lead to the formation of a film of ice at the upper part of the said barometric tube. Such an incident can be avoided by first of all placing the compressor in operation at controlable speeds.

Furthermore, it should be noted that convection streams are formed which tend to equalize the temperature of the column of sea water in the course of treatment over its entire height, the hottest and therefore lightest water having a tendency to rise to the surface, while the coldest water descends as long as its temperature remains above 4° C. It is known that as from this temperature, the change in state of water and its progressive solidification as ice tends to cause a decrease in density, while the cooling to 4° C. had up to then resulted in a progressive increase in said density.

It should be noted that the hottest zone of the coils is precisely that which is at the level of the surface layers which are most cooled by the evaporation. As another favorable factor, the increase in salinity due to the evaporation results in a local increase in density which tends constantly to cause the renewal of the surface layers.

The curve of FIGURE 3 shows the variation of the theoretical yield as a function of $T'$ for a temperature $T=15°$ C., that is to say, for an absolute temperature equal to 288° K. One obtains a yield of about 14.4 for a temperature $T'$ equal to 35° C., and twice the theoretical yield, that is to say, 28.8 for a temperature $T'$ equal to 25° C. and four times the yield, that is to say, 57.6, for a temperature of 20° C.

However, there must be taken into account the fact that the practical yield cannot in general exceed 70% of the theoretical yield, which therefore leads to a practical yield of between 20 for a temperature difference of the order of 10° C. between the hot source and the cold source, and 10 for a difference of 20° C.

The arrangement in accordance with the invention is an open-circuit refrigerating arrangement which can supply a yield equal to 10, assuming the vaporization of one kilogram of water requires the transfer of about 600 millitherms, the motor assuring this work will require only the mechanical equivalent of 60 millitherms, namely, 252 kilojoules per kilogram of water vaporized. One given unit of power therefore makes it possible to vaporize 14 kg. of fresh water per kwhr.

However, by further reducing the temperature difference which is already low (20°) between the hot source and the cold source by increase of the exchange surfaces, it does not seem unreasonable to expect to be able to reach a quantity of 20 kg. of fresh water per kwhr.

One can therefore state that it is between these two values of 14 and 20 kg. of fresh water per kwhr. that the yield of the arrangement is definitely located, which makes it forthwith possible to determine the profitability thereof as a function of the different possible uses and on basis of the high cost price of the conventional solutions for the distillation of sea water or salt water permitting the obtaining of a perfectly fresh water.

It will be understood that various changes can be made in the embodiments herein described, or certain parts may be replaced by equivalent parts, without departing from the overall nature of the invention.

What is claimed is:

1. An apparatus for distilling sea water including distillation means in combination with solid removal means wherein said distillation means comprises a barometric tube; and evacuating means comprising a compressor communicating with the top of the tube for withdrawing distilland vapors from the tube and compressing the same, a tank located at the bottom of said tube; a float-operated sea water inlet valve means located near the top of said tank, said valve means maintaining a constant level of sea water in said tank sufficient to close the bottom of said tube; a condenser comprising an assembly of heat exchange coils located within said tube and communicating with the outlet of said compressor, said coils being of suitable cross section with respect to the cross section of said tube; and a distilled water outlet connecting said coils at their lower portions to an outlet valve operated in synchronism with said evacuating means operatively connected to evacuate the upper area space within said tube so as to reduce the pressure and permit sea water to rise to a predetermined level, said evacuating means further maintaining a vacuum above the sea water in said tube sufficient to cause water vaporization in relation to the sea water temperature thereat so that said heat exchange coils receive the compressed distillant vapors from the space above the water in said tube and convey the resultant condensing vapors to said distilled water outlet, the surface area of said coils being sufficient to restore to the sea water substantially all of the heat lost thereby over a relatively small vertical distance measured from said sea water level; and wherein said solid removal means comprises a sloping bottom in said tank supported on a suitable foundation; well means communicating with said tank into which said sloping bottom debouches, a conveyor means located within said well means for removing inorganic salts therefrom, and discharge means near the top of said well means to which said inorganic salts are projected from said conveyor means.

References Cited

UNITED STATES PATENTS

| | | | |
|---|---|---|---|
| 1,966,938 | 7/1934 | Stone | 203—26 |
| 2,793,988 | 5/1957 | Latham et al. | 203—11X |
| 2,863,501 | 12/1958 | Farnesworth | 203—26X |
| 2,899,366 | 8/1959 | Hickman | 202—205 |
| 3,147,201 | 9/1964 | Nickerson | 202—187 |
| 3,214,352 | 10/1965 | Wells | 203—11X |
| 3,290,229 | 12/1966 | Brown | 203—11 |
| 3,294,649 | 12/1966 | Powall | 203—26X |
| 3,340,159 | 9/1967 | Tidball et al. | 203—11 |

NORMAN YUDKOFF, Primary Examiner

F. E. DRUMMOND, Assistant Examiner

U.S. Cl. X.R.

202—205; 203—26